Feb. 21, 1956   R. K. UNSWORTH   2,735,130
RETRACTABLE CASTER
Filed March 13, 1951   2 Sheets-Sheet 1
FIG.1
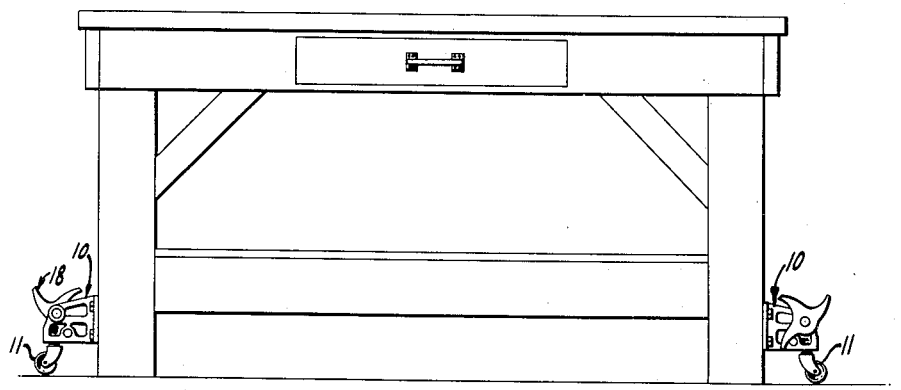
FIG.2
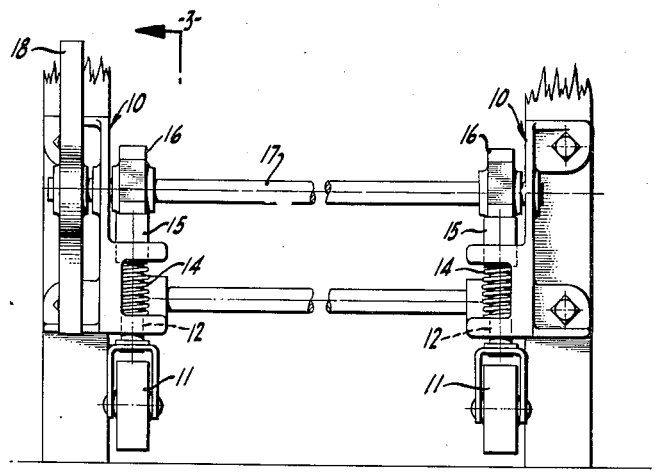
FIG.3
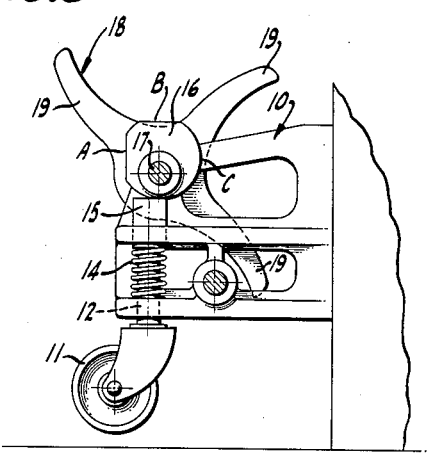
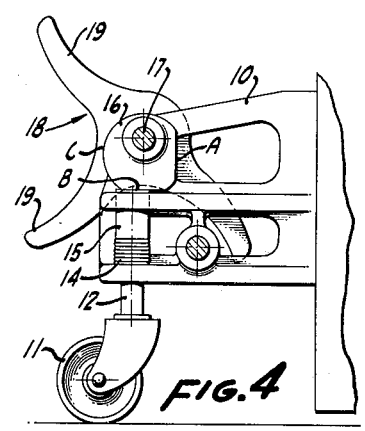
FIG.4
INVENTOR.
ROBERT K. UNSWORTH
BY
Mellin and Hanscom
ATTORNEYS Feb. 21, 1956

R. K. UNSWORTH 2,735,130

RETRACTABLE CASTER

Filed March 13, 1951

INVENTOR.
ROBERT K. UNSWORTH

BY

*Mellin and Hausam*

ATTORNEYS

United States Patent Office 2,735,130
Patented Feb. 21, 1956

2,735,130

RETRACTABLE CASTER

Robert K. Unsworth, Redwood City, Calif., assignor to Magna Engineering Corporation, San Francisco, Calif., a corporation of California Application March 13, 1951, Serial No. 215,245

5 Claims. (Cl. 16—33)

This invention relates to caster mounting means for heavy objects such as work benches and machine tools.

It is the principal object of my present invention to provide an improved caster mounting and operating mechanism for relatively heavy structures such as work benches, tables, machine tools and the like, which is simple in construction but which may be effectively operated manually to enable the casters to be positioned in an ineffective position enabling the structure to rest directly on the floor or ground, or be elevated out of contact therewith and supported solely by the casters to render such structures mobile.

My invention contemplates providing the structure with a plurality of casters which are normally disposed in an ineffective position so that the structure may rest directly on the floor or ground and be comparatively immobile. There is associated with the casters a cam mechanism for operating the casters so that they may be engaged with the ground and elevate the structure therefrom so that the structure will be rendered mobile on the casters, which mechanism is operable to thereafter lower the structure into engagement with the ground and retract the casters to an ineffective position.

The invention is exemplified in the following description and illustrated by way of example in the accompanying drawings, in which:

Fig. 1 is a view in side elevation of a work bench or table fitted with my improved apparatus.

Fig. 2 is a fragmentary view in end elevation of the table structure shown in Fig. 1, showing the application of the caster mechanism thereto.

Fig. 3 is a fragmentary view in section taken on line 3—3 of Fig. 2, showing the cam shaft in section and showing the relative position of a cam with respect to its associated caster.

Fig. 4 is a view similar to Fig. 3 with the exception that it illustrates the caster in extended position supporting the structure on which the caster mechanism is mounted.

Figures 5, 6, 7:
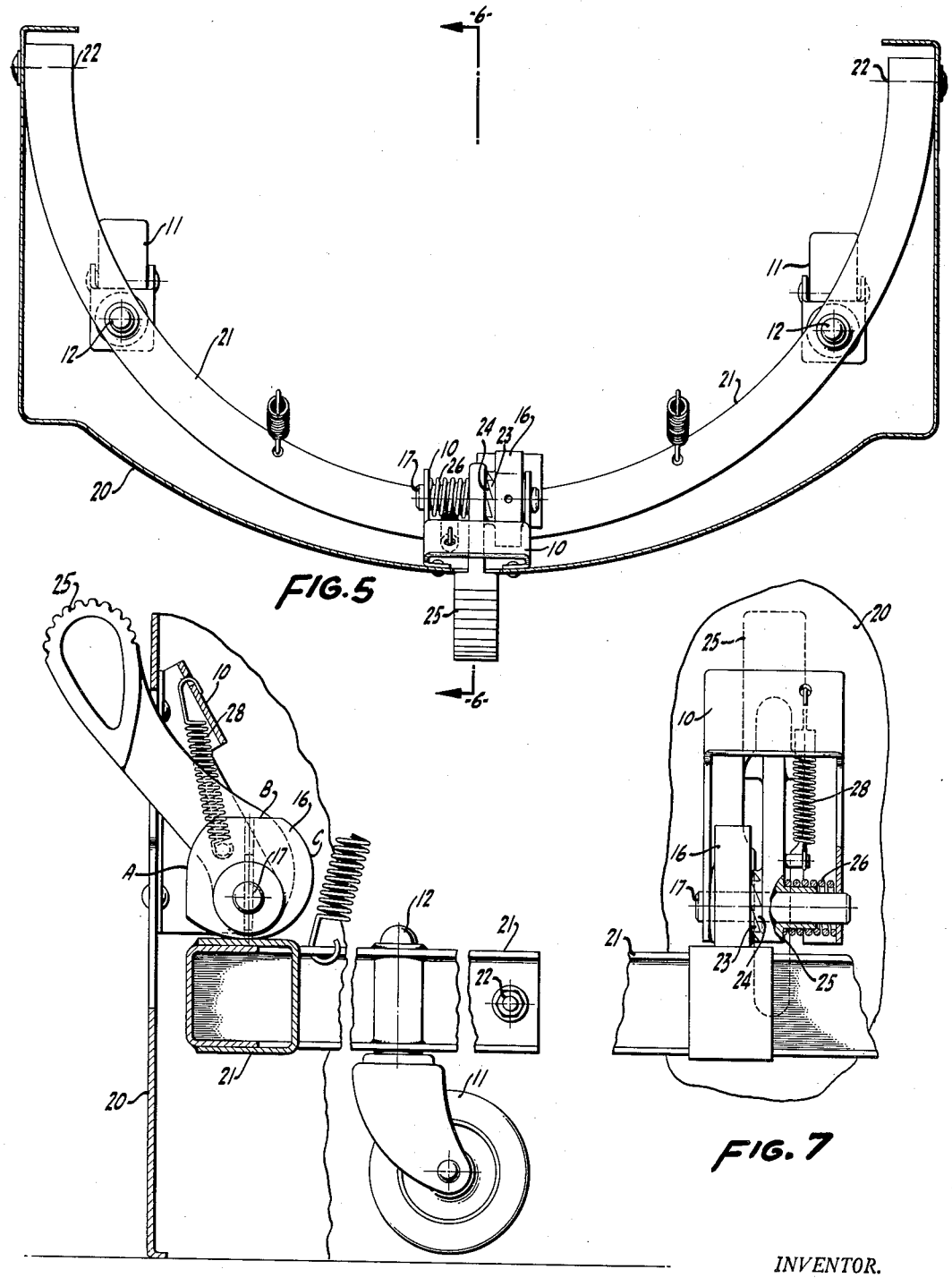
Fig. 5 is a view in plan section of a second form which my caster operating mechanism may assume.
Fig. 6 is a fragmentary view in section taken on line 6—6 of Fig. 5, showing certain details of construction.
Fig. 7 is a fragmentary view in elevation, with parts broken away and in section, of the cam operating mechanism disclosed in Fig. 6.

Referring more particularly to the accompanying drawings, I there disclose two embodiments of my present invention. Both embodiments are in essence the same as they both contemplate the use of essentially the same cam operation for positioning the casters for effective use in rendering the structure on which they are mounted mobile, or permitting the casters to retract to an ineffective position for enabling the structures to rest directly on the floor or on the ground and thus be comparatively immobile. In both embodiments of the invention the casters are moved from a retracted and ineffective position and the structure on which they are mounted elevated above the floor so that the weight of the structure is borne by the casters by rotation of cam means in a step by step operation always in the same direction. Likewise, in both, manual means, such as a foot operating element, is employed for operating the cam means to accomplish the above purposes.

In Figs. 1 to 4, inclusive, of the drawings, wherein one type of apparatus embodying my invention is disclosed, I have disclosed the apparatus as applied to a structure such as a work bench or table. However, it is obvious that the apparatus may be fitted to a wide variety of structures and devices, such as machine tools, stoves, etc., and I do not limit myself to any particular application.

The casters are applied to the lower frame portion of the structure, or that portion which is normally adapted to rest on a plane horizontal surface, such as a floor or the ground.

In Figs. 1 to 4, inclusive, I have shown the apparatus as including rigid brackets 10 which are fixed to the lower frame portion of the structure, as illustrated. In these figures the brackets 10 are shown as projecting laterally outward from the frame. However, obviously, they may be disposed within the outer perimeter of the frame structure, if so desired. Each bracket 10 is fitted with a caster 11 having a vertical pintle 12 reciprocably mounted in the bracket 10, as illustrated. A spring 14 is interposed between a fixed bracket portion and the upper enlarged head 15 of the pintle 12 for the purpose of normally maintaining the caster in a position vertically spaced from the bottom of the frame structure and above the plane horizontal surface upon which that structure normally rests. In this position, of course, the structure will rest at its bottom on the plane surface, such as the floor or the ground and will be comparatively immobile.

For the purpose of rendering the casters effective to elevate the structure from engagement with the plane surface so that the structure will be supported on the wheels of the casters 11 and thus be mobile, there is associated with each caster 11 a rotatable cam 16. As is illustrated in Figs. 1 to 4, there is a pair of casters 11 at each end of the structure, and for the purpose of operating the cams 16 there is a common cam shaft 17 for each pair of cams. The cam shaft 17 at each end of the structure is disposed on a horizontal axis and journaled at its ends in suitable bearings in the brackets 10. The cam 16 for each caster 11 is in vertical register with the pintle 12 of such caster so that upon rotation, it will effect vertical reciprocation of that pintle. The cams, of course, are all identical and the cams of each pair are in substantial exact registration.

Each cam is so contoured as to have a three-stage or step cycle of one revolution. That is to say, it is formed with three cam or dwell faces A, B and C. The faces A and B are, in general, of approximately the same angularity, while the face C is of a slightly greater angularity, so that in three increments of one revolution the cam will travel through one complete cycle of operation. When the cam 16 is turned to engage the face A with the top of the pintle 12, the caster 11 will be projected downwardly against the action of the spring 14 an amount sufficient to engage the floor, and when the cam is turned to abut the face B against the pintle 12, the brackets 10 with the structure to which they are attached will be elevated relative to the caster 11 against the action of the spring 14, thereby elevating the structure off the plane surface or floor and rendering it mobile. Inasmuch as the cam surfaces A and B are substantially tangential to a circle concentric with the cam shaft 17, the engagement of such surfaces with the flat end of the pintle 12 will effectively hold the cam against inadvertent rotation.

When the cam is turned through the third step or stage of its operation, the declining face C will lower the structure relative to the caster to engage the ground and enable the spring 14 to retract the caster above the ground surface, as illustrated.

Each cam shaft 17 is independently operated to operate its associated pair of casters 11 through the medium of a pedal wheel 18 which is formed with three relatively fixed substantially radially projecting pedals 19. The pedal wheel 18 is, of course, fixed at one end of the cam shaft 17 in an outboard position, as illustrated in Fig. 2, and is capable of being operated manually by foot pressure on a pedal 19 to advance the cams 16 step by step through their cycle of operation with the foregoing result.

In operation of the apparatus disclosed in Figs. 1 to 4, inclusive, assuming that the apparatus is in the condition shown in Fig. 3, a downward movement imparted to a pedal 19 of the cam shaft will rotate the shaft in a counterclockwise direction and register the faces A of the cams 16 with the pintles 12 of the casters 11, forcing the same downward into engagement with the ground or plane surface upon which the structure rests. Similar operation of the succeeding pedal 19 of the pedal wheels 18 will register the cam faces B with the upper ends of the pintles 12, and inasmuch as this cam face is spaced radially outward considerably further than the face A from the center of the cam shaft 17, the brackets 10 and the structure to which they are affixed will be elevated relative to the casters 11 to the position shown in Fig. 4, rendering the structure mobile on the casters 11.

If it is desired to again render the structure immobile and retract the casters 11, a third step of operation is effected by depression of the third pedal 19 of the pedal wheel 18 to present the cam surface C in register with the pintles 12 and thus lower the structure into engagement with the ground and cause retraction of the casters 11. In this position the cams 16 and the pedal wheels 18 will, of course, be in condition for subsequent operation of the same character as just described. It should be noticed that the cams 16 are always rotated in the same direction, counterclockwise as viewed in Fig. 3 and that the rotation of the pedals 19 by foot in a clockwise direction would be decidedly inconvenient.

It should be further noted from Fig. 3 that the pedal 19 appearing in about the eleven o'clock position is approximately in line with the trailing edge of the cam or dwell surface A; that the pedal 19 shown in about the two o'clock position is approximately in line with the trailing edge of the cam or dwell surface B; and that the remaining or third pedal is approximately in line with the first mentioned pedal. The essential condition here is that the position of each pedal be such that when at rest it is in a convenient position to be foot-actuated to rotate the cam through the required angle to thus let the next succeeding dwell surface come into play. Except for this there is nothing particularly critical with respect to the location of the three pedals 19.

In Figs. 5 to 7, inclusive, I have shown a slightly modified form of apparatus for accomplishing the same result. This type of apparatus is applicable where the lower frame portion of the structure to which the casters are applied is of the box type. I have indicated the frame structure in Fig. 5 by the numeral 20. In this type of structure the pintles 12 of the casters 11 are collared in a semi-circular yoke 21 pivoted at its ends as at 22 to the frame portion 20 so that the yoke may oscillate about the pivotal points 22 in a vertical plane.

Disposed centrally between the casters 11 and centrally of the yoke 21 is the operating cam 16 of the same configuration as that previously described. This cam is mounted on the cam shaft 17 journaled in a bracket 10, fixed to the frame 20. At one end, the cam 16 is provided with a face ratchet wheel 23 complemental to a face ratchet 24 on an oscillatory pedal 25. The pedal 25 is, of course, pivoted on the cam shaft 17, and a spring 26 normally tends to maintain the ratchets 23 and 24 in engagement. Depression of the free end of the pedal 25 by means of the foot or otherwise will operate the cam 16 through the medium of the ratchets 23 and 24 to advance the cam step by step through its cycle of operation, as previously described in connection with the pedal wheel 18 and the cam 16. A spring 28 is provided to return the pedal 25 to starting position after each operation thereof.

As the cam passes through its cycle of operation, it will first depress and lower the yoke 21 to engage the casters 11 with the ground and thereafter elevate the structure, of which the frame 20 is a part, all as previously described. Upon the third step of its operation the cam will permit the frame to lower and the yoke to elevate the casters off the ground for the purpose as previously pointed out.

In operation of the type of device disclosed in Figs. 5 to 7, inclusive, assuming that the parts are in the position shown in Fig. 6, the first depressive stroke of the pedal 27 will lower the yoke and engage the casters 11 with the ground, and upon the second stroke, the yoke will be further lowered causing relative elevation of the frame 20 off the ground so that the structure, of which the frame 20 is a part, will be mobile on the casters 11. Upon the third depressive stroke of the pedal 27, the frame will be allowed to lower relative to the yoke and the yoke elevate the casters 11 off the ground, again permitting the frame to engage and bear on the ground or floor and be rendered comparatively immobile.

From the foregoing, it is obvious that I have provided a very simple and effective apparatus of the type disclosed which will enable comparatively relative heavy structures, such as work benches, tables, machine tools and the like to be rendered mobile when it is desired, but enable these structures to bear firmly and be comparatively immobile on the floor or ground when they are positioned for use.

While I have shown two preferred forms of apparatus for practicing the invention, I wish it understood that various changes may be made therein by those skilled in the art, without departing from the invention as defined in the appended claims.

Having thus described my invention, what I claim and desire to secure by Letters Patent is:

1. A frame; a caster pintle mounted in said frame for axial movement relative thereto; a cam cylinder mounted on said frame over said pintle and in contact therewith for rotation in a given direction on a horizontal eccentric axis; a plurality of stepped dwell faces formed on said cylinder, each said dwell face being spaced from its contiguous dwell face not more than 90°; a plurality of foot pedals associated with said cam and arranged for rotation about said eccentric axis and extending substantially radially therefrom, there being one such pedal adjacent the trailing edge of each of said dwell face and an additional such pedal located not more than 90° rearwardly of the last of the preceding pedals; and spring means for biasing said pintle upwardly against said cam cylinder.

2. A frame; a caster pintle mounted in said frame for axial movement relative thereto; a cam cylinder eccentrically mounted on said frame for rotation on a horizontal axis over and in contact with said pintle for rotation in a given direction; a plurality of stepped dwell faces formed on said cylinder; means for rotating said cam in angular increments corresponding respectively to the angular increments between said dwell faces, including a series of foot pedals rotatable on said horizontal axis and extending radially thereof, one adjacent the trailing edge of each dwell face and one not more than 90° to the rear of the last of said dwell faces; and spring means for biasing said pintle axially toward said cam cylinder.

3. A frame; a caster pintle vertically mounted in said frame for axial movement relative thereto; a circular cam cylinder eccentrically mounted on said frame over said pintle and in contact therewith for rotation on a horizontal eccentric axis; a first dwell face formed on said cam cylinder at a position not greater than 90° from the portion of its perimeter nearest said axis, a second dwell face formed on said cam cylinder at a position not greater than 90° from said first dwell face, the minimum distance from said eccentric axis to said first dwell face being greater than the distance between said eccentric axis and said portion but less than the minimum distance between said axis and said second dwell face; a first foot pedal operatively associated with said cam and extending radially from said axis between said first and second dwell faces; a second foot pedal extending radially from said axis and adjacent the trailing edge of said second dwell face at an angle of not more than 90° from said first foot pedal; and spring means for biasing said pintle towards said cam.

4. A frame; a caster pintle mounted in said frame for vertical axial movement relative thereto; a horizontal cam shaft mounted in said frame over said pintle; a generally cylindrical cam eccentrically mounted on said cam shaft in engagement with the upper end of said pintle; a first flat dwell surface formed on said cam normal to a radial line intersecting its portion of maximum eccentricity; a second flat dwell surface formed on said cam perpendicular to said first dwell surface, the shortest distance between said first dwell surface and the axis of said shaft being substantially greater than the shortest distance between said second dwell surface and said axis; first, second and third foot pedals secured to said cam shaft and extending radially therefrom, said first and third pedals being diametrically opposed to each other, and extending between said first and second dwell surfaces, and said second pedal extending radially and substantially normal to said first and third pedals; and means for biasing said pintle upwardly in contact with said cam.

5. In combination with a structure having a frame to engage and rest on a plane horizontal surface, a caster carried by said frame and movable vertically with respect thereto and normally spaced above said surface; a cam cylinder carried by said frame, said cylinder being rotatable about an eccentric axis and formed with two flat stepped dwell faces each subtending an angle of not more than 90°, the vertex of which is located on said axis, and the angle included by the respective normals to said dwell faces and passing through the axis of rotation of said cylinder being not greater than 90°; operating means associated with said cam including a plurality of foot pedals for rotating said cylinder step by step only in one direction, there being one such pedal for each of said dwell faces extending substantially radially from said axis of rotation adjacent the trailing edge of one of said dwell faces and an additional pedal located rearwardly of the last of said preceding pedals not more than 90°; and spring means for upwardly biasing said caster against said cam cylinder.

References Cited in the file of this patent

UNITED STATES PATENTS

| | | |
|---|---|---|
| 12,198 | Everitt | Jan. 9, 1855 |
| 872,742 | Oesterle et al. | Dec. 3, 1907 |
| 896,050 | Zwemer | Aug. 11, 1908 |
| 1,092,220 | Koch et al. | Apr. 7, 1914 |
| 1,369,804 | Hagedorn | Mar. 1, 1921 |
| 2,473,873 | Fosbender | June 21, 1949 |

FOREIGN PATENTS

| | | |
|---|---|---|
| 356,774 | Great Britain | Sept. 11, 1931 |